UNITED STATES PATENT OFFICE.

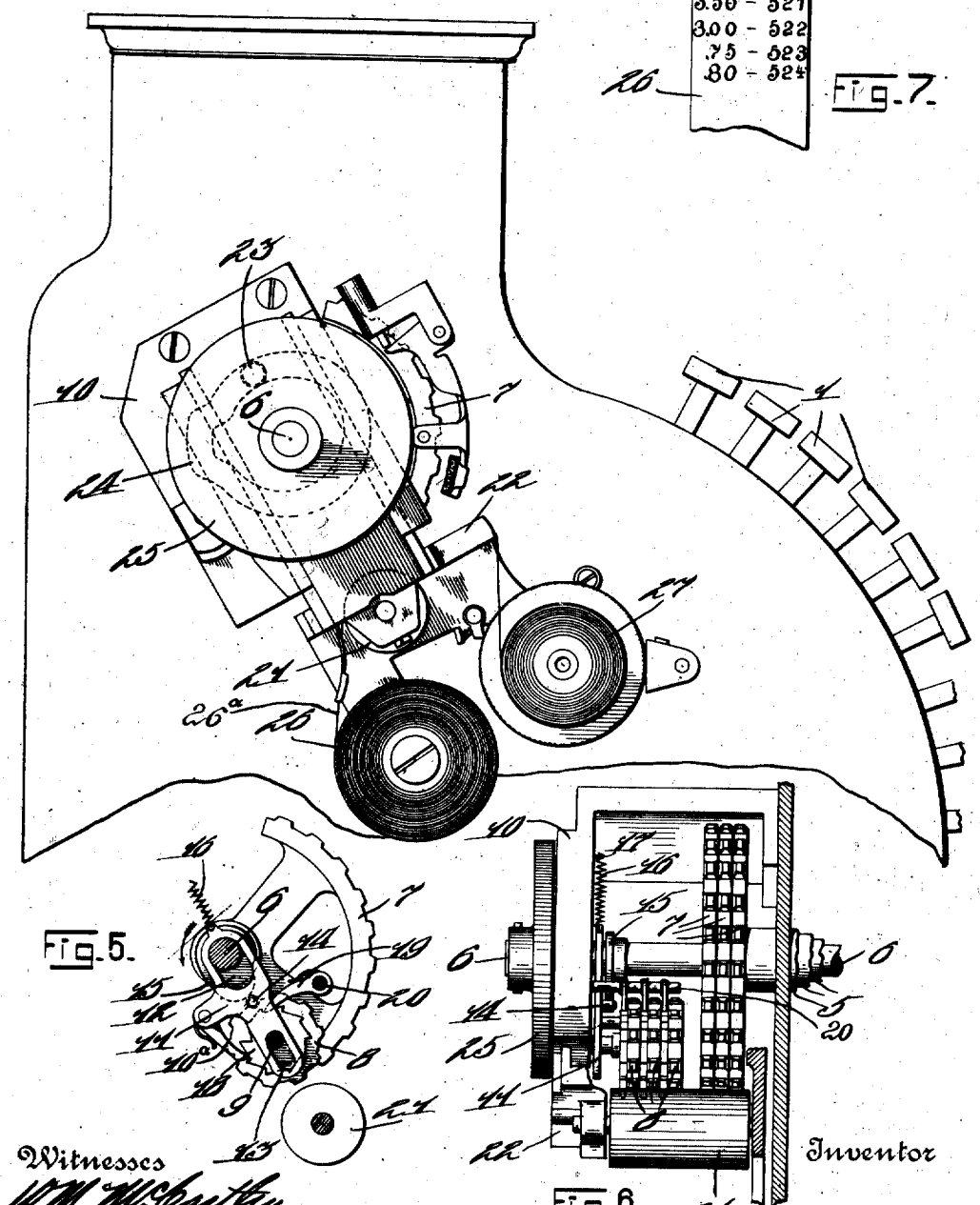

WILLIAM H. MUZZY, OF NEW YORK, N. Y., ASSIGNOR TO THE NATIONAL CASH REGISTER COMPANY, OF DAYTON, OHIO, A CORPORATION OF OHIO, (INCORPORATED IN 1906.)

CASH-REGISTER.

994,773.  Specification of Letters Patent.  Patented June 13, 1911.

Application filed August 11, 1908. Serial No. 448,032.

*To all whom it may concern:*

Be it known that I, WILLIAM H. MUZZY, a citizen of the United States, residing at New York, in the county of New York and State of New York, have invented certain new and useful Improvements in Cash-Registers, of which I declare the following to be a full, clear, and exact description.

This invention relates to improvements in cash registers and has more particular relation to improvements in devices for detecting any misoperation of the register.

The principal object of this invention is to provide a device controlled by the cash register and which is visible from or at any part of an establishment, for indicating a character or a series of characters which correspond to characters printed in juxtaposition to the amount of sale upon the record strip of the cash register, so that each amount recorded may be identified.

With this and incidental objects in view, the invention consists in certain novel features of construction and combination of parts, the essential elements of which are set forth in appended claims, and a preferred form of embodiment of which is hereinafter specifically described with reference to the drawings which accompany and form part of this specification.

Figure 1:
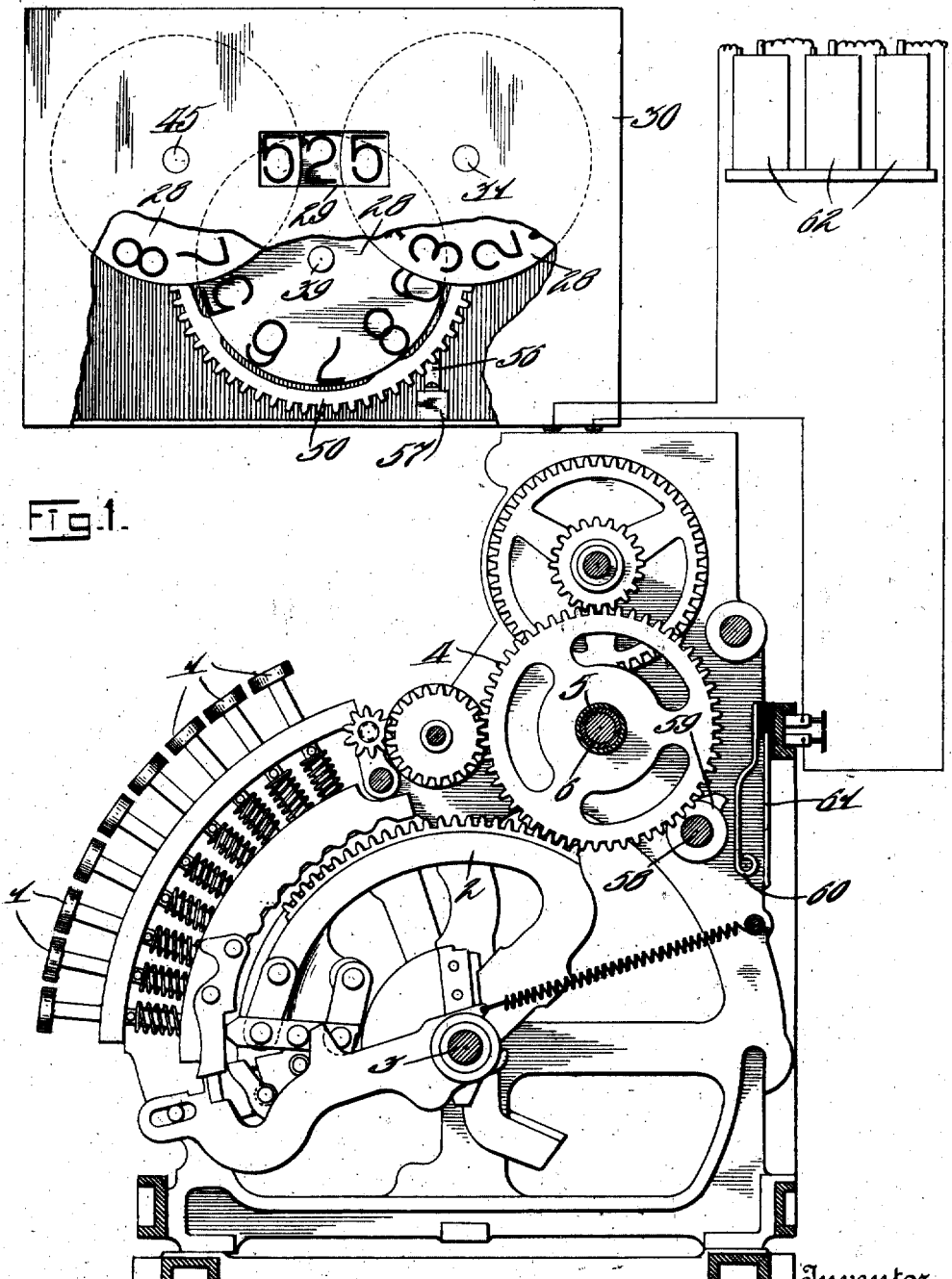
Figure 2:
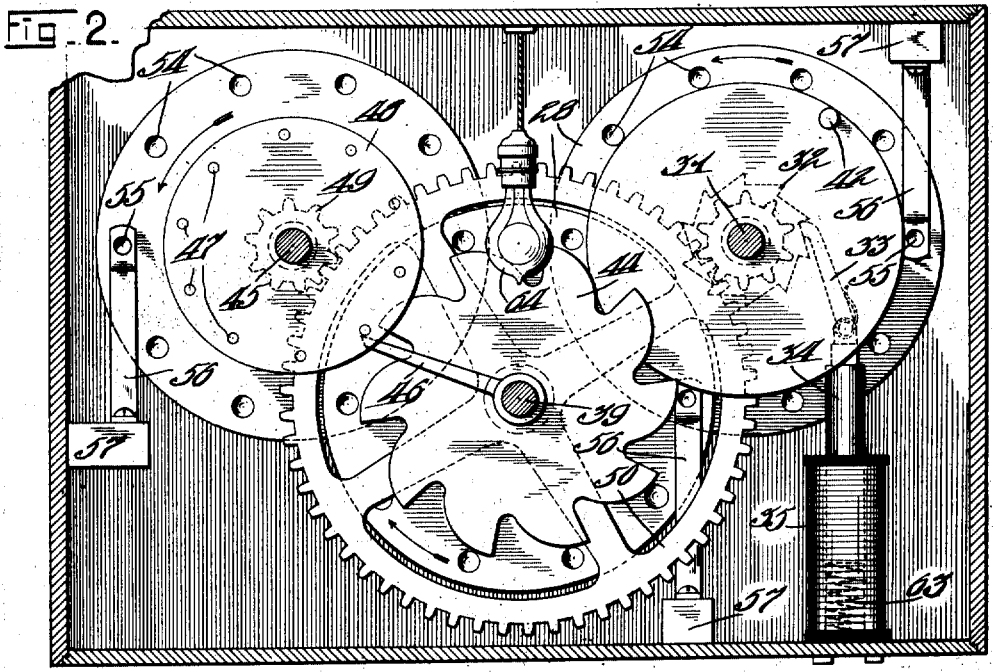
Figure 3:
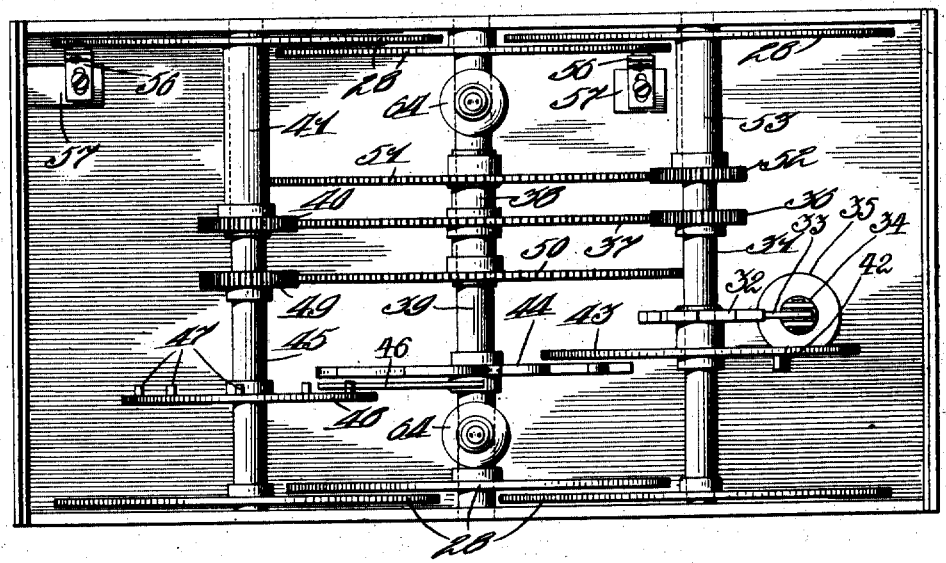

Of said drawings: Figure 1 represents a central transverse section through the type of machine shown in the patent to Cleal and Reinhard No. 580,378, of April 13, 1897, with the distant indicator connected thereto. Fig. 2 represents a vertical section through the distant indicator. Fig. 3 represents a top plan view of the distant indicator with the top removed. Fig. 4 represents an end elevation, partly broken away, showing the printing mechanism of the type of machine shown in Fig. 1. Fig. 5 represents a detail side elevation, partly in section, of the amount and consecutive number type carriers. Fig. 6 represents a front elevation of the mechanism shown in Fig. 5. Fig. 7 represents a portion of the record strip showing a few amounts and consecutive numbers printed thereon.

Described in general terms the invention comprises a cash register having a plurality of banks of amount keys (only one being shown) which control the differential movement of type carriers, the latter having adjacent thereto, type wheels, which are advanced one number upon each operation of the machine, so as to print the consecutive number as well as the amount of each sale. An illuminated indicating mechanism having consecutively numbered wheels is arranged to be suspended in an establishment, so as to be visible from any part thereof, and is controlled by the cash register. The wheels of the consecutive number printing and indicating mechanisms are arranged so as to print the number indicated and then advance both mechanisms one numeral, so that the amount of any particular sale will be recorded opposite the number displayed by the indicator.

*Recording mechanism.*—The keys 1 of each bank control a differentially movable segment 2, which is mounted upon a central transverse rock shaft 3. The segment 2 of each bank meshes with a gear 4 fast to the inner end of one of a series of nested sleeves 5, which surround a rotary shaft 6. These sleeves 5 extend through the frame of the machine, as shown in Fig. 6, and have secured to their opposite ends type carriers 7 in the form of segments. Adjacent to the segments 7 are type wheels 8 (see Figs. 5 and 6), which are loosely mounted upon a stub shaft 9 which protrudes from one side of the printer frame 10. These wheels are advanced by means of a three-prong pawl 10ª carried by a spring drawn slide 11 that is provided with elongated slots 12 and 13, which surround the shafts 6 and 9 respectively.

A laterally extending pin 14 projects from the slide 11 and is held in contact with a cam 15 secured to the shaft 6 by a spring 16, the ends of which are connected to the upper end of the slide 11 and a pin 17 projecting inwardly from the printer frame 10. As the shaft 6 is rotated in the direction of the arrow in Fig. 5, the spring 16 will draw the slide upwardly, so that the pawl 10 will engage with the succeeding teeth of the ratchet wheels 18 carried by the printer wheels 8, and near the end of the revolution of the shaft 6, the cam 15 will contact with the pin 14 and carry the slide to the position shown, by which movement the units wheel will be advanced one space. The transfer between the printer wheels is effected by the well known form of deep notch mechanism. The wheels 8 are held in their adjusted position by spring operated retaining pawls 19, which engage with the teeth of the ratchet wheels 18, these pawls being mounted upon a stub shaft 20, which extends laterally from the printer frame 10.

A platen 21 (see Fig. 4) is carried by the reciprocating frame 22 mounted within the printer frame 10. The frame 22 is provided with laterally extending roller 23, which plays in a cam groove 24 of a disk 25, secured to one end of the rotary shaft 6. The configuration of the groove 24 is such that the frame 22 carrying the platen roll 21, will first be lowered and then raised to take an impression from the type carriers 7 and 8 and finally lowered to the position shown in the drawings. The frame 22 also carries a record strip supply roll 26, the strip 26ª being led over the platen roller 21 to a storage roll 27, which is also carried by the frame 22. The reciprocating movement of the frame 22, to take an impression from the type carriers, as previously described, is also used to feed the record strip, as is well known in the art.

*Indicating mechanism.*—This mechanism comprises disks 28, containing numerals which are arranged to be displayed through openings 29 of opposite sides of a casing 30. The units disk 28, as shown in Figs. 2 and 3, is fast upon a shaft 31, to which is also secured a ratchet wheel 32. A spring pawl 33 secured to the upper end of a core 34 of a solenoid 35, engages the teeth of the ratchet wheel 32, and moves said wheel step by step as the core 34 is reciprocated as hereinafter described.

Secured to the shaft 31 is a pinion 36 which meshes with a gear wheel 37, loosely mounted upon a sleeve 38 that surrounds a shaft 39, and in turn meshes with a pinion 40, secured to one end of a sleeve 41, the other end of said sleeve carrying the units disks 28 upon the opposite side of the casing 30. The tens disks 28 are secured to the opposite ends of shaft 39, the said shaft being arranged to be moved one space upon the complete revolution of the shaft 31 by means of a pin 42, projecting from a disk 43 carried by the shaft 31, engaging a tooth of a ratchet wheel 44 secured to the shaft 39, the latter shaft in turn rotating a shaft 45, which supports the sleeve 41, by a finger 46 secured to the shaft 39 contacting with pins 47, projecting from a disk 48, secured to the shaft 45, once upon each revolution of the shaft 39. The movement of the shaft 45 which carries the hundreds disk 28 is transferred to the hundreds disk upon the opposite side of the casing by means of a pinion 49, secured to the shaft 45, which engages with a gear 50, secured to one end of the sleeve 38, the other end of said sleeve carrying a similar gear 51, which meshes with a pinion 52 secured to one end of a sleeve 53 surrounding the shaft 31, the other end of said sleeve carrying the hundreds disk 28. The disks 28 which appear upon one side of the casing 30 are provided with indentations 54 into which snugly fit concave portions 55 of leaf springs 56, so as to hold the disks against any accidental displacement. These springs 56 are adjustably mounted upon blocks 57 secured to the inside of the casing 30. A shaft 58 which corresponds to the shaft G of the said Cleal and Reinhard patent, carries a cam disk 59, which near the end of the revolution of said shaft contacts with a leaf spring 60 forming one part of a switch, and forces said spring into engagement with the other member 61 of the switch and temporarily closes a circuit through the solenoid 35 from the storage batteries 62.

As the solenoid 35 is energized, the core 34 is drawn downwardly against the tension of a coil spring 63 located in the bottom of the solenoid and carries with it the pawl 33, which engages with the succeeding tooth of the ratchet wheel 32. As the solenoid is deënergized by the cam disk 59 passing out of engagement with the contacting spring 60, the coil spring 63 within the solenoid 35 will force the core 34 upwardly, so as to rotate the units disk one space.

The disks 28 may be of any suitable material, but preferably of frosted glass with the numerals painted thereon, through which the rays of light from constantly burning incandescent lamps 64 may shine.

While it is not broadly new to provide a cash register with devices for indicating and recording identifying characters, the devices heretofore employed have been located at the cash register, so that unless the identifying characters displayed at the machine were inspected, which would arouse the suspicions of the clerk, there were no means to detect whether the proper registration was made.

With the mechanism herein described, a person employed by the proprietor would enter the store, casually observe the indicator which may be seen from any part thereof, make a purchase and depart without going near the cash register. He informs the proprietor of the amount of purchase and the number displayed by the indicator, who upon going over the record strip discovers that a less amount was registered, would know that the machine has been improperly operated.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a cash accounting machine, the combination with devices for recording within the machine the amount and a distinct character to identify each of any number of sales, means controlled by the machine for indicating at a distance the identifying character of each sale recorded.

2. In a cash accounting machine, the combination with devices for recording within the machine different amounts, and a character to independently identify each amount, of an electrically operated indicator controlled by the machine for indicating a corresponding identifying character for each amount recorded.

3. In a cash accounting machine, the combination with devices for recording the amount and an independent identifying number for each amount, of means controlled by the machine for indicating at a distance the number of each sale recorded.

4. In a cash accounting machine, the combination with type carriers for printing the amount and an independent identifying number for each sale, of means controlled by the machine for designating at a distance from the machine the number of the sale printed.

5. In a cash accounting machine, the combination with devices for recording the amount and number of each sale, of an electrically operated indicator controlled by the machine for indicating the number of the sale recorded.

6. In a cash accounting machine, the combination with devices for recording the amount and number of each sale, of an electrically operated indicator for indicating the number of the sale recorded, a circuit for said indicator including a normally opened switch, and means controlled by the accounting machine for closing the switch.

7. In a cash accounting machine, the combination with devices for recording the amount and number of each sale within the machine, of a distant indicator for indicating the number of the sale recorded, a solenoid for actuating the indicator and a source of electrical energy for the solenoid controlled by the accounting machine.

8. In a cash accounting machine, the combination with a printing mechanism, including type carriers for printing upon a record strip the amount and consecutive number of each sale, of a distant indicator for indicating a corresponding consecutive number of the sale recorded upon the record strip, a magnetic device for actuating the indicator, and a source of electrical energy for the magnet controlled by the accounting machine.

In testimony whereof I affix my signature in the presence of two witnesses.

WILLIAM H. MUZZY.

Witnesses:
R. W. FAIRCHILD,
W. M. MCCARTHY.